Patented Sept. 29, 1942

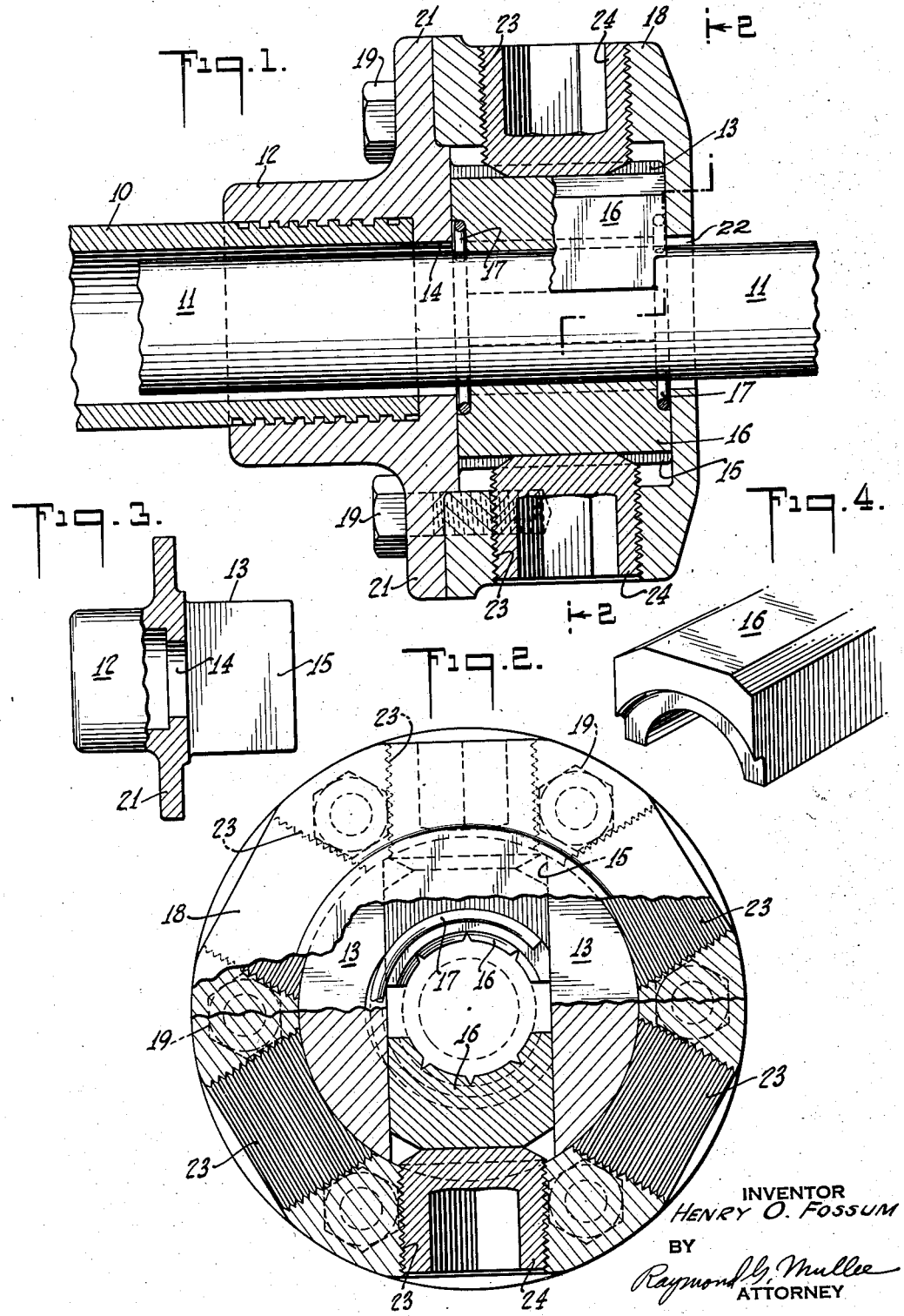

2,297,140

UNITED STATES PATENT OFFICE 2,297,140

CHUCK

Henry O. Fossum, Detroit, Mich., assignor to Chicago Pneumatic Tool Company, New York, N. Y., a corporation of New Jersey Application October 29, 1940, Serial No. 363,239

2 Claims. (Cl. 279—66)

This invention relates generally to chuck mechanism and particularly to a chuck assembly adapted for use in diamond drills and like machines. More specifically, the invention is concerned with a rotary driving chuck of the type having radially reciprocable jaws and a set screw mechanism for moving the jaws into gripping engagement with the driven tool.

One object of the invention is to enable the set screws to control movement of the chuck jaws from gripping position through the provision of spring means urging the jaws outward into engagement with the screws.

Another object of the invention is to place the set screw mechanism wholly within the periphery of the chuck assembly, and obtain thereby a balanced chuck free of radial projections.

Another object of the invention is to prolong the useful life of the chuck assembly by providing therein a plurality of selectively usable series of set screw openings.

Other objects and structural details of the invention will be more apparent from the following description when read in conjunction with the accompanying drawing, wherein:

Fig. 1 is a view in longitudinal section of a chuck assembly embodying the invention, showing the manner in which the assembly acts to connect the feed screw and drilling rod of a diamond drill;

Fig. 2 is a view, partly in cross section and partly in front elevation, of the chuck assembly shown in Fig. 1, and is taken substantially along the irregular line 2—2 of Fig. 1;

Fig. 3 is a view, partly in elevation and partly in section, of the chuck body on a reduced scale; and Fig. 4 is a fragmentary detail view, in perspective, of one of the chuck jaws.

The invention is disclosed herein as embodied in a chuck for use in diamond drills. Such a drill includes, as shown in Fig. 1, a projecting feed screw 10 through which a working tool in the form of a tubular drilling rod 11 is passed. The feed screw 10 is given a rotary driving movement during operation of the drill and is at the same time advanced toward the work. In order that similar movements may be imparted to the drilling rod 11, a chuck mechanism is provided which is adjustable to interlock the rod and the feed screw for operation as a unit.

The present chuck mechanism is an assembly and includes a main body portion 12 secured to the outer end of the feed screw 10. The chuck body 12 has a forwardly projecting portion 13 of reduced diameter (see Fig. 3) and is formed with a central bore 14 to permit the passage of the drill rod 11 therethrough. Referring also to Figs. 2 and 3, it will be seen that projecting portion 13 is bifurcated by a transverse longitudinally extending slot 15. Arranged in the slot 15 are two oppositely disposed lugs or chuck jaws 16 which are held in spaced relation by a pair of spring clips 17 pressed in complementary recesses at the rear and front ends of the jaws. The chuck jaws 16 are thus caused to rotate with the main chuck body 12 and are movable radially with respect to the central bore 14 into and out of engagement with the drilling rod 11. The rod 11 extends between the jaws 16 and when gripped thereby is constrained to move with the chuck body and feed screw 10. The adjacent faces of the chuck jaws 16 are concave in shape (see Fig. 4) to obtain a greater bearing upon the drilling rod and are serrated to assure a firm gripping engagement with the rod.

The means for pressing the jaws 16 into gripping engagement with the drilling rod 11 is comprised in a housing 18 forming another element of the chuck assembly. The housing 18 encloses the bifurcated projecting portion 13 and is secured by bolts 19 to an annular flange 21 formed on the chuck body 12. The drilling rod 11 extends through a central opening 22 (Fig. 1) in the housing 18. Formed in the inwardly extending rim of the housing 18 is a plurality of oppositely disposed pairs of screw threaded openings 23. When the housing 18 is bolted to the flange 21, one or another of the pairs of openings 23 is aligned with the transverse slot 15. A set screw 24 is inserted in each of the selected aligned openings 23 and extends into the slot 15 to contact a respective one of the chuck jaws 16. By adjustment of the set screws 24 within the openings 23 the jaws 16 may be pressed inward to grip the drilling rod, or the pressure on the jaws may be relaxed and the springs 17 thereby enabled to move the jaws to ineffective position. Each set screw lies wholly within the rim of the housing 18 and is adjusted by a wrench having a polygonal shank insertable into a correspondingly shaped recess within the screw. By placing the set screw mechanism within the periphery of the housing, a better balance of the chuck assembly is obtained. Furthermore the safety of operation is increased through elimination of potentially injurious radial projections.

An important feature of the invention is the provision of a plurality of pairs of openings 23. In the operation of a diamond drill it is necessary frequently to loosen or release the chuck mechanism in order that another section may be added to the drilling rod. In chucks employing set screws, therefore, the threads within the screw openings become worn in a comparatively short time. If, as is customary in the prior art, only one pair of openings is provided for the set screws, the entire chuck assembly is disabled when the threads in the screw openings become worn. In the present chuck, however, when the threads in one pair of openings 23 become unsuitable for use, the housing 18 may be readjusted with respect to the body portion 12 to bring a new set of openings into registry with the jaws 16. The several pairs of openings are so arranged that in any rotative position of the housing in which the bolts 19 may be inserted in the rim thereof one or another of the pairs of openings will be aligned with the transverse slot 15.

What is claimed is:

1. A chuck assembly, comprising a rotatable chuck body having a longitudinal bore through which a drilling or like tool may be passed, a pair of radially movable chuck jaws within said chuck body for gripping the tool, a housing partly enclosing said chuck body and having an annular rim paralleling said longitudinal bore, a plurality of oppositely disposed pairs of screw threaded transverse openings in the rim of said housing, means for securing said housing in a plurality of positions relatively to said chuck body to bring said pairs of openings selectively into a position exposing said chuck jaws, said means including securing element receiving means disposed parallel to said longitudinal bore and occupying spaced positions between said screw threaded transverse openings, and set screws extensible through a selected pair of transverse openings for moving said chuck jaws into gripping engagement with the tool, said screws being engageable throughout their length with the threads in said transverse openings and arranged in operating position to lie within the rim of said housing.

2. A chuck assembly, comprising a rotatable chuck body having a longitudinal bore through which a drilling or like tool may be passed, a pair of radially movable chuck jaws within said chuck body for gripping the tool, a housing partly enclosing said chuck body and having an annular rim paralleling said longitudinal bore and a front face holding said chuck jaws against outward axial movement, said front face being closed except for an aperture permitting the passage of the drilling tool therethrough, a plurality of oppositely disposed pairs of screw threaded transverse openings in the rim of said housing, means for securing said housing in a plurality of positions relatively to said chuck body to bring said pairs of openings selectively into a position exposing said chuck jaws, and set screws adjustable within a selected pair of transverse openings for moving said chuck jaws into gripping engagement with the tool.

HENRY O. FOSSUM.